United States Patent
Wojcieszak et al.

(10) Patent No.: US 6,832,334 B2
(45) Date of Patent: Dec. 14, 2004

(54) COMPUTER REGISTER WATCH

(75) Inventors: Laurent Wojcieszak, Meylan (FR);
Isabelle Sename, Grenoble (FR);
Stephane Bouvier, Saint-Ismier (FR)

(73) Assignee: STMicroelectronics S.A., Gentilly (FR)

( * ) Notice: Subject to any disclaimer, the term of this patent is extended or adjusted under 35 U.S.C. 154(b) by 644 days.

(21) Appl. No.: 09/748,763

(22) Filed: Dec. 22, 2000

(65) Prior Publication Data
US 2001/0027538 A1 Oct. 4, 2001

(30) Foreign Application Priority Data
Dec. 23, 1999 (GB) ............................................. 9930590

(51) Int. Cl.$^7$ ................................................ H02H 3/05
(52) U.S. Cl. .......................................... 714/28; 703/28
(58) Field of Search ............................ 714/28, 29, 30, 714/33, 34, 40; 703/14, 15, 21, 23, 26, 28; 712/227, 233

(56) References Cited

U.S. PATENT DOCUMENTS

| | | | |
|---|---|---|---|
| 5,404,496 A | 4/1995 | Burroughs et al. | |
| 5,430,862 A | 7/1995 | Smith et al. | |
| 5,544,311 A | 8/1996 | Harenberg et al. | 395/183.16 |
| 5,546,599 A | 8/1996 | Song | |
| 5,564,041 A | 10/1996 | Matsui et al. | 395/500 |
| 5,621,886 A | 4/1997 | Alpert et al. | |
| 5,627,981 A | 5/1997 | Adler et al. | |
| 5,644,703 A | 7/1997 | Kurakazu et al. | 395/183.11 |
| 5,664,159 A * | 9/1997 | Richter et al. | 703/23 |
| 5,715,440 A | 2/1998 | Ohmura et al. | |
| 5,748,936 A | 5/1998 | Karp et al. | |
| 5,752,013 A | 5/1998 | Christensen et al. | |
| 5,754,839 A | 5/1998 | Pardo et al. | |
| 5,828,824 A | 10/1998 | Swoboda | |
| 5,857,094 A | 1/1999 | Nemirovsky | |
| 6,230,119 B1 * | 5/2001 | Mitchell | 703/27 |
| 6,282,630 B1 * | 8/2001 | Nguyen et al. | 712/23 |
| 6,289,300 B1 * | 9/2001 | Brannick et al. | 703/28 |
| 6,353,883 B1 | 3/2002 | Grochowski et al. | |

FOREIGN PATENT DOCUMENTS

| | | | |
|---|---|---|---|
| EP | 0 667 576 | 8/1995 | |
| EP | 0 720 092 A1 | 7/1996 | |
| EP | 0 810 519 | 12/1997 | |
| EP | 0 849 674 | 6/1998 | |
| EP | 0 869 434 | 10/1998 | ............ G06F/11/00 |
| EP | 0 943 995 | 9/1999 | ............ G06F/11/00 |

OTHER PUBLICATIONS

Standard Search Report in connection with British counterpart of U.S. Ser. No. 09/748,785.
Standard Search Report in connection with British counterpart of U.S. Ser. No. 09/748,762.
Standard Search Report in connection with British counterpart of U.S. Ser. No. 09/748,077.
Standard Search Report in connection with British counterpart of U.S. Ser. No. 10/021,269.

* cited by examiner

Primary Examiner—Dieu-Minh Le
(74) Attorney, Agent, or Firm—Lisa K. Jorgenson; James H. Morris; Wolf, Greenfield & Sacks, P.C.

(57) ABSTRACT

A computer system includes instruction fetch circuitry, decode circuitry to decode instructions and identify any registers to be used and dispatch circuitry to dispatch instructions to one or more execution units, said system including emulator circuitry for debug operations which is arranged to watch data values in one or more selected registers modified during execution of the instructions, the computer circuitry further comprising a register watch store for identifying one or more registers to be watched, comparator circuitry for comparing registers identified by said decode circuitry with registers identified in said register watch store and providing a hit signal for hits in the comparison, and instruction insertion circuitry responsive to hit signals to insert in the instruction sequence to an execution unit a store instruction to store in a location accessible by the emulation circuitry the data value in a data register identified by a hit signal after execution of the instruction using the data register.

15 Claims, 5 Drawing Sheets

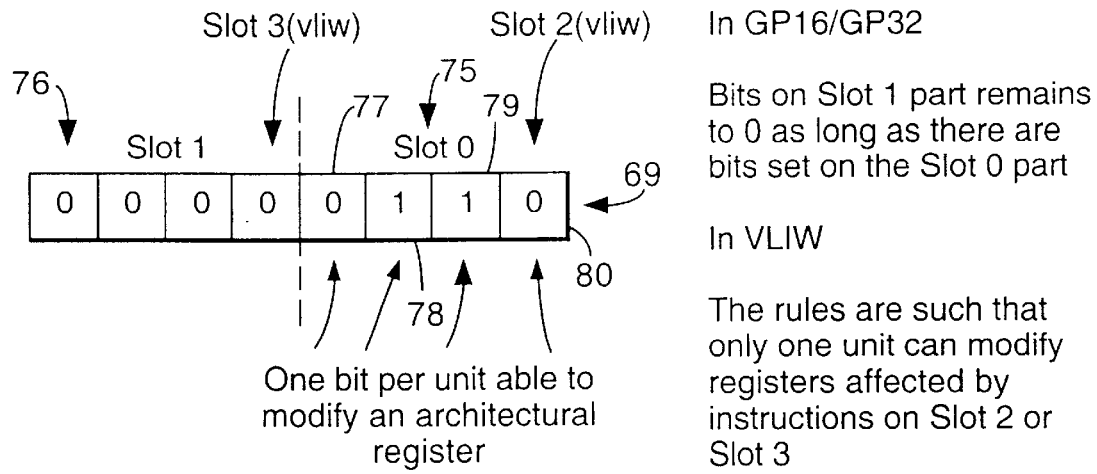
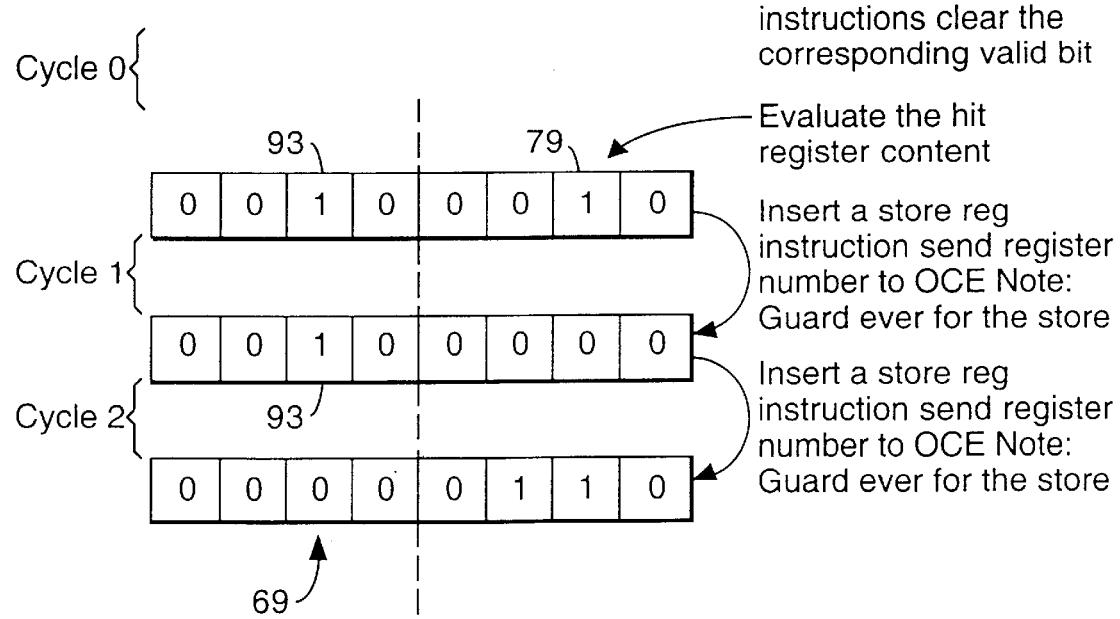

Fig. 7.
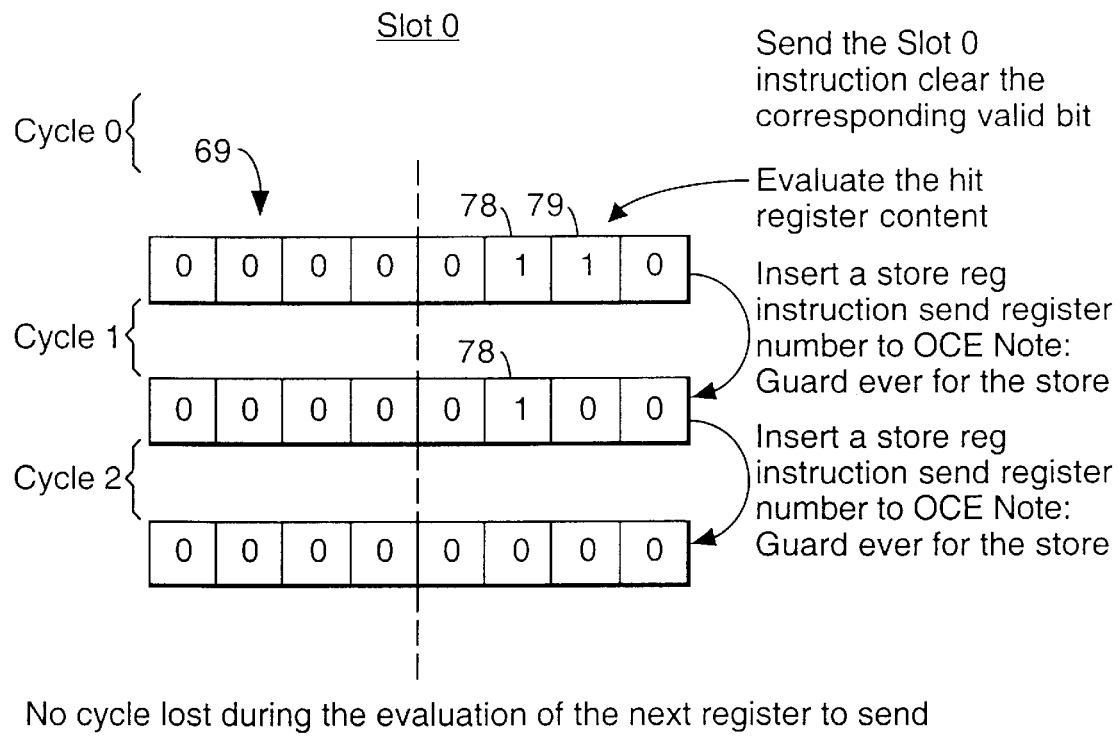
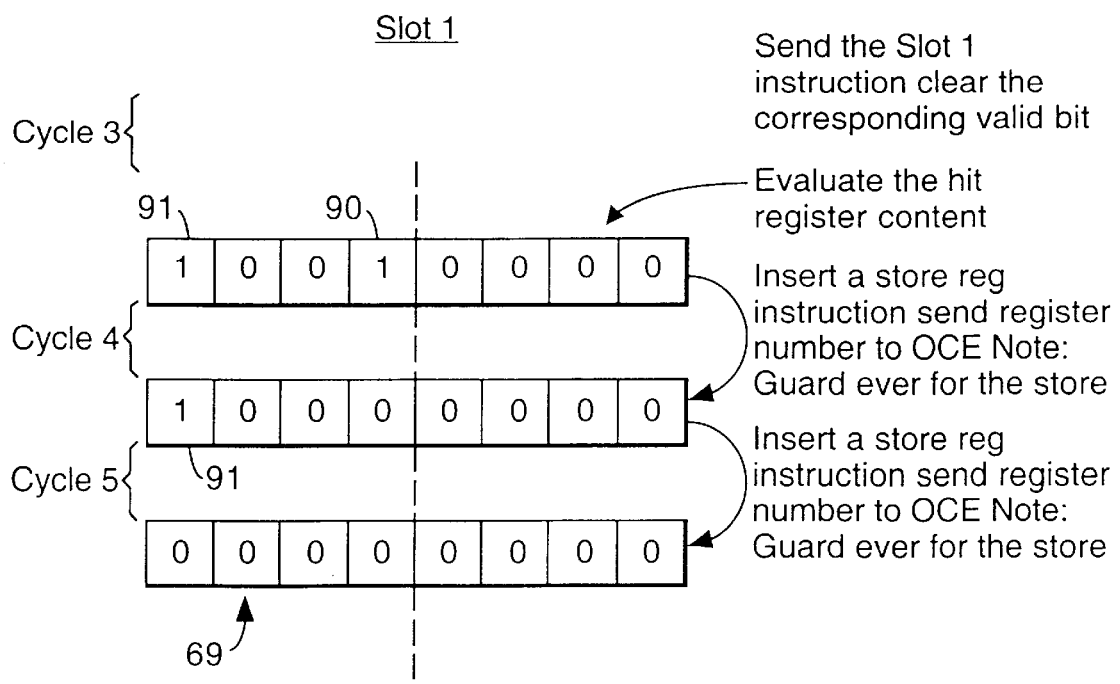

COMPUTER REGISTER WATCH

The invention relates to a computer system with a debug facility for watching a selected register or registers.

BACKGROUND OF THE INVENTION

The invention is applicable to high performance digital processors including those with on-chip debug facilities. Such processors may operate with pipelined execution of instruction sequences in one or more parallel execution units together with prediction guard values associated with instructions so that execution depends on resolution of the guard value. The debug operation may be effected by emulation circuitry, which may be on chip, and may be arranged to observe changes occurring in internal architectural registers of the processor.

Systems have been proposed in which identified registers are watched by the provision of physical wires to allow the values in the registers and any changes in those values to be monitored by emulation circuitry to which the physical wires are connected. This may however produce routing congestion and does require additional hardware. It may not be suited to high speed digital processors.

It is an object of the present invention to provide an improved computer system and method of operating a computer system in which specified registers may be watched during execution of one or more instruction sequences.

SUMMARY OF THE INVENTION

The invention provides a computer system for executing a sequence of instructions and effecting changes in data held in one or more registers during execution of the instructions, which computer system includes instruction fetch circuitry, decode circuitry to decode instructions and identify any registers to be used in execution of the instruction, and dispatch circuitry to dispatch instructions to one or more execution units after decoding, said computer system including emulator circuitry for debug operations which emulator circuitry is arranged to watch data values in one or more selected registers modified during execution of the instructions, which computer circuitry further comprises a register watch store for identifying one or more registers to be watched, comparator circuitry for comparing registers identified by said decode circuitry with registers identified in said register watch store and providing a hit signal for hits in the comparison, and instruction insertion circuitry responsive to hit signals to insert in the instruction sequence to an execution unit a store instruction to store in a location accessible by the emulation circuitry the data value in a data register identified by a hit signal after execution of the instruction using the data register.

Preferably the register watch store is responsive to the emulator circuitry to select which registers are identified in the register watch store.

Preferably the emulator circuitry includes program count watch circuitry for watching fetch addresses supplied to a program memory and providing a program count indication for any selected instruction supplied to an execution unit.

Preferably a plurality of parallel execution units are provided and said comparator circuitry is arranged to identify which execution unit will receive any instruction providing a hit signal.

Preferably the instruction fetch circuitry is arranged to fetch more than one instruction in each fetch operation, the instructions being supplied in parallel to respective execution units and said comparator circuitry being operable to identify hit signals for more than one parallel instruction.

Preferably the or each execution unit comprises a pipelined execution unit.

Preferably the register watch store comprises a plurality of registers each identifying a respective data register usable in execution of an instruction, said emulator circuitry being operable to identify in said plurality of registers which data registers are to be watched.

Preferably said comparator circuitry is operable to compare the output of said decode circuitry with said plurality of registers and to set values in a hit signal store where register hits are found in said comparison.

Preferably said instruction insertion circuitry is arranged to insert a store instruction in each instruction sequence immediately after any instruction which is decoded and provides said hit signal.

Preferably the store instruction inserted in the instruction sequence is arranged to store the data register value in a store location determined by the emulator circuitry.

Preferably the computer system comprises a single integrated circuit chip device and said emulator circuitry is located on the same chip.

The invention includes a method of executing a sequence of instructions in a computer system and effecting changes in data held in one or more registers during execution of the instructions, which method comprises fetching a sequence of instructions from a program memory, decoding fetched instructions and identifying any registers to be used on execution of each instruction, dispatching decoded instructions to one or more execution units after decoding and executing said instructions, said method further comprising operating emulator circuitry for a debug operation by identifying one or more registers to be watched during instruction execution, comparing said identified registers with registers indicated during decoding of instructions to be executed and forming a hit signal where execution of any instruction will use a register corresponding to an identified register to be watched, and in response to said hit signal inserting a store instruction in the instruction sequence to be supplied to the execution unit so as to store the data value put into the identified register in a store accessible to the emulator circuitry.

Preferably instructions are fed in parallel to a plurality of parallel execution units.

Preferably the or each execution unit executes instructions in a pipelined operation.

Preferably each instruction in the instruction sequence includes a guard or prediction value to be determined on execution of the instruction, said inserted store instruction having a guard value which confirms that the store instruction will be executed.

BRIEF DESCRIPTION OF THE DRAWINGS

FIG. 6 illustrates use of a hit register in operation of the system of FIG. 2;

FIG. 7 illustrates a sequence of operation cycles of the system of FIG. 2 with one format of instructions; and FIG. 8 illustrates successive cycles of operation of the system of FIG. 2 with a different format of instructions.

Figure 1:
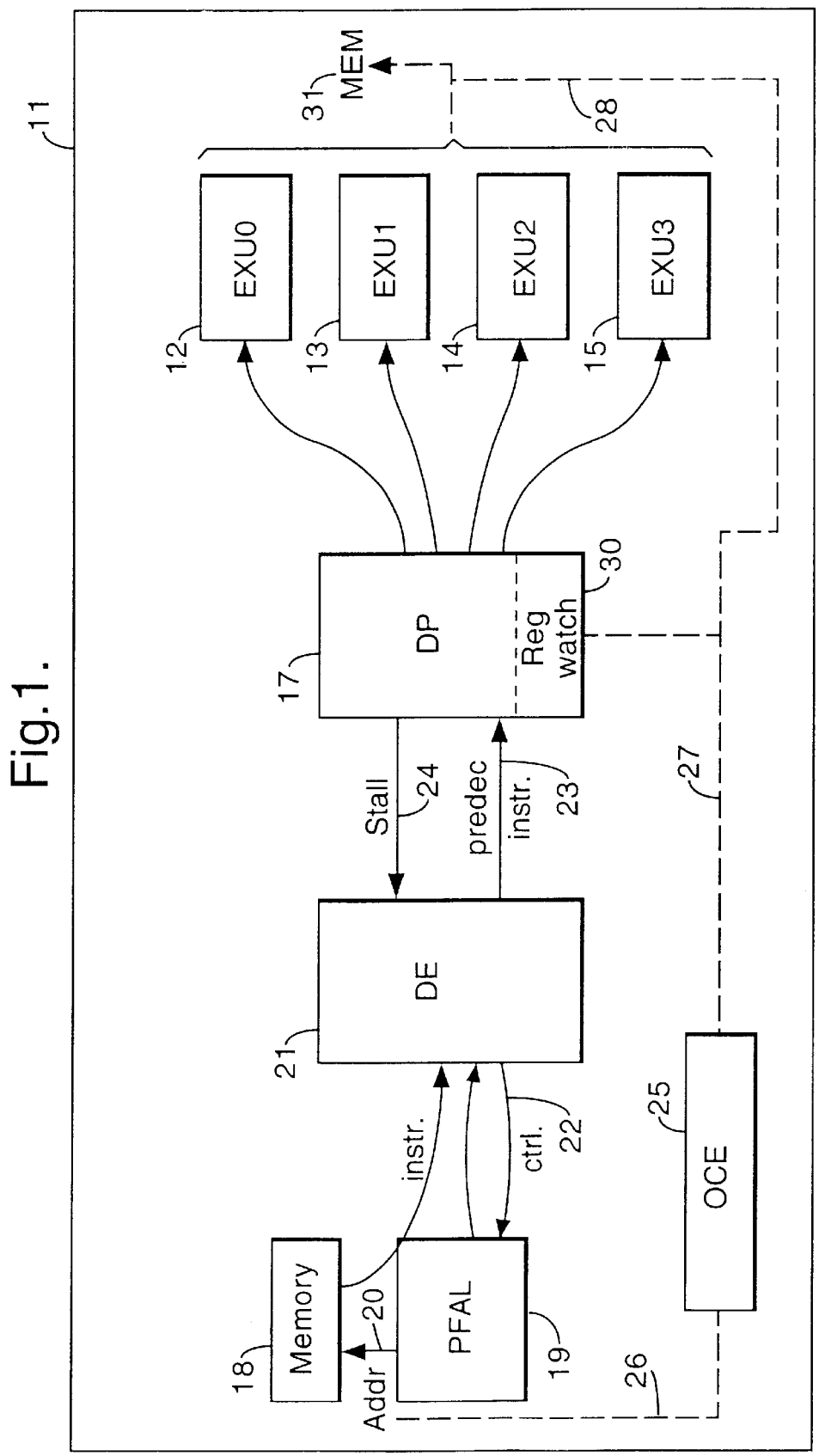
FIG. 1 is a block diagram of a digital signal processor in accordance with the present invention.

The system shown in FIG. 1 comprises a high speed digital signal processor implemented on a single chip 11. The processor has four parallel pipelined execution units 12, 13, 14 and 15 which each receive instructions sequentially from a dispatch unit 17. Program instructions are held in a program memory 18 and are fetched by a program fetch and align unit 19 by memory addresses 20 fed to the memory 18. After alignment of the fetched instructions, they pass to a decode unit 21 which may supply control signals 22 to the program fetch unit 19. The decode unit 21 supplies decoded instructions on line 23 to the dispatch unit 17. When the dispatch unit 17 requires a stall in the supply of decoded instructions it supplies a signal on line 24 to the decode unit 21. An on-chip emulator circuit 25 is provided and this has communication channels 26 to the fetch address circuitry 20. It also has connections 27 to allow communication with register watch circuitry 30 in the dispatch unit 17 as well as communication path 28 connected between the execution units 12/15 and a data memory 31.

Figure 2:
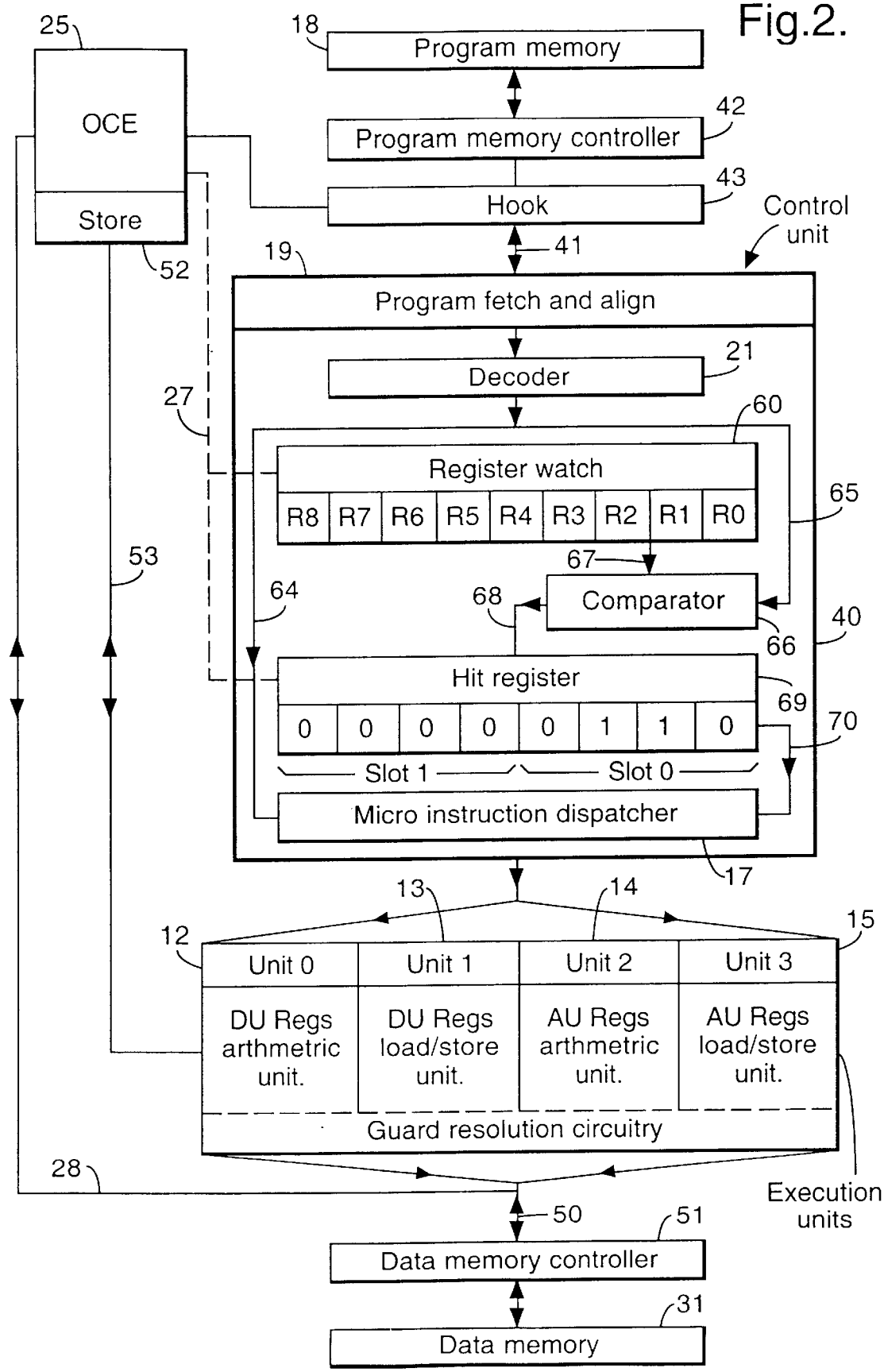
FIG. 2 shows further details of the processor of FIG. 1.

More detail of the computer system is shown in FIG. 2. The program fetch and align circuit 19, decoder 21 and dispatcher 17 all form part of a control unit 40 which will be described in more detail below. The control unit 40 is connected through a bi-directional connection 41 to a program memory controller 42 controlling accesses to the program memory 18. The on-chip emulator 25 is connected through hook circuitry 43 to the communication path 41 between the control unit 40 and the program memory controller 42 so that the on-chip emulator can watch details of the memory accesses which are made and identify the program count of specific instructions which are obtained from memory and supplied to the execution units.

In this case the execution units comprise four parallel units 12, 13, 14 and 15 each having a pipelined execution sequence involving architectural registers in each of the execution units. These have been identified as unit 0, unit 1, unit 2 and unit 3. Unit 0 is a data unit including registers for use in arithmetic operations. Unit 1 is a data unit including registers for use in load/store operations. Unit 2 is an address unit having registers for use in arithmetic operations. Unit 3 is an address unit having registers for use in load/store operations. Each of the execution units 12–15 includes guard resolution circuitry for resolving guard or prediction indicators provided with each of the instructions supplied to the respective execution unit. The execution units have a bi-directional communication path 50 with a data memory controller 51 connected to the data memory 31. The on-chip emulator 25 has a data dedicated memory or store 52. The store 52 is connected by a communication path 53 with each of the execution units 12–15. Communication path 28 between the OCE 25 and the data memory access path 50 allows the OCE 25 to carry out a watch on load store operations carried out in the data memory 31.

In this particular example the emulator 25 with its store 52 is able to watch data changes in selected architectural registers within the units 12, 13, 14 and 15. The control unit 40 includes a register watch store 60 which includes a plurality of one bit registers corresponding to specific numbered registers within the execution units 12–15. In the examples shown the registers which may be watched have been indicated as R0–R8. The register watch store 60 is connected through line 27 to the OCE 25 so that before executing a program the OCE may determine which registers in the execution units are to be watched and thereby setting to the value 1 each of the corresponding register position R0–R8 in the register watch store 60.

Figure 4:
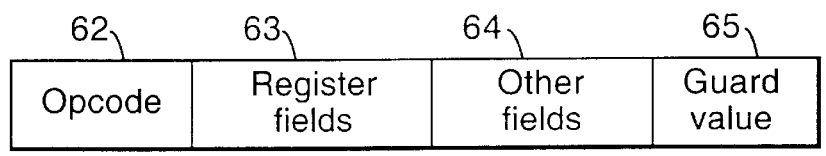
FIG. 4 shows a schematic arrangement of fields within an instruction for use with the system of FIG. 2.

The decoder 21 decodes a sequence of instructions each having formats of the general type shown in FIG. 4. Each of these instructions includes a plurality of fields. In the example shown in FIG. 4 the op-code of the instruction is identified by field 62. Field 63 may identify one or more registers which will act as sources or destinations of data values for use in execution of the instruction. Various other characteristics of the instruction may be identified in other fields 64. A prediction or guard value for the instruction may be included in field 65. When this instruction is decoded by the decoder 21 it provides an output on line 64 to a microinstruction dispatcher 17 which generates and dispatches microinstructions to the respective execution unit 12–15 depending on the output of the decoder 21. The decoder 21 also provides an output on line 65 to form one of two inputs to a comparator circuit 66. A second input 67 to the comparator is formed by the outputs of the register watch store 60 indicating which registers between R0 and R8 have been selected to be watched. Where correspondence is found between registers selected in the register watch 60 and registers identified in one or more fields 63 of the instruction decoded by the decoder 21, the comparator 66 will provide a hit output on line 68 so as to set hit values in a hit register 69. In each instruction sequence where a hit is located, the hit register 69 will supply an output on line 70 to cause the dispatcher 17 to insert in the instruction sequence a "store" instruction immediately after the instruction which has given rise to the register hit. The store instruction will require the execution unit executing that instruction sequence to provide an output on line 53 to the store 52 storing the data value held in the register identified by the register hit immediately after execution of the instruction which gave rise to the register hit. In this way the value which has been placed in that register will be supplied to a store location determined by the OCE 25 and accessible by the emulator circuitry. In this way the execution units can supply to the store 52 architectural register values which the emulation circuitry 25 wishes to watch without the need for separate physical connections between each of the watched registers and the emulator circuitry 25.

Figure 3:
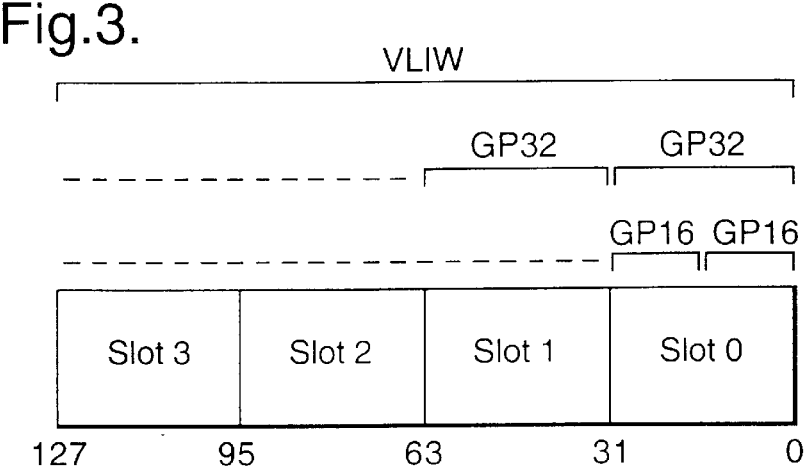
FIG. 3 shows schematically the format of instruction fetches used with the system of FIG. 2.

The manner in which the hit register 69 operates will be described in more detail below. Firstly it is necessary to explain the manner in which instructions are supplied to the processor of this example. Each fetch operation from the program memory 18 fetches an instruction word having a bit length of 128. The format of the instructions used may be a GP16 format in which each instruction has a bit length of 16 bits. Alternatively it may be a GP32 mode in which each instruction is 32 bits long. Alternatively it may operate in VLIW mode. In each case an instruction fetch will obtain a word 128 bits long and supply this to the program fetch and align unit 19. The 128 bit word is illustrated in FIG. 3 and consists of slot 0, slot 1, slot 2 and slot 3 each 32 bits long. When operating in GP16 mode each slot includes two instructions. In GP32 mode, each slot includes a single instruction. In VLIW mode four 32 bit instructions are included, one in each slot. When operating in GP16 mode or GP32 mode, only two parallel instructions are fed in each cycle through the decoder 21 and dispatcher 17. In VLIW mode, all four instructions are supplied simultaneously through the decoder 21 and dispatcher 17.

Figure 5:
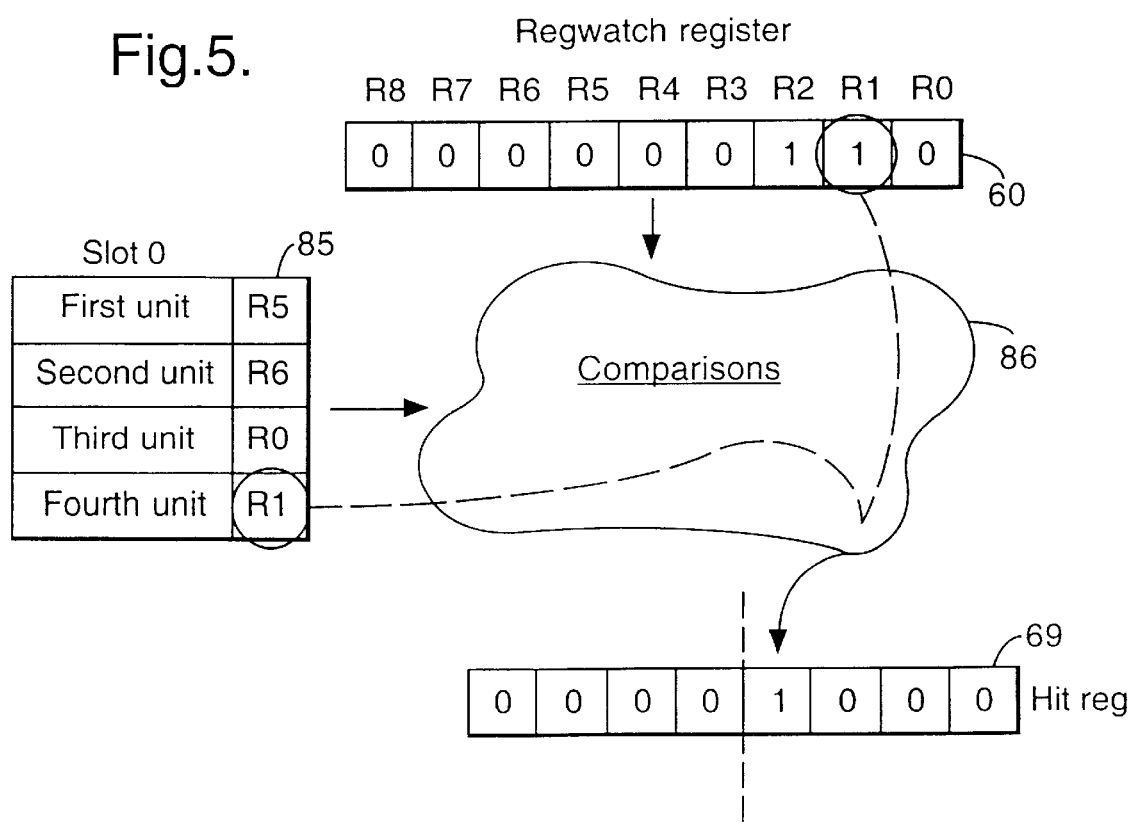
FIG. 5 shows schematically a comparison system used to identify register hits used in operation of the system of FIG. 2.

The hit register 69 has eight 1 bit registers. As illustrated in FIGS. 2, 5 and 6, each half of the register 69 includes four bits corresponding respectively to the four execution units 12, 13, 14 and 15.

In FIG. 6, the righthand half 75 of the hit register 69 includes four bits 77, 78, 79 and 80 corresponding respectively to hits or no hits in the execution units 12–15 resulting from decoding the instruction in slot 0 of FIG. 3. In this particular example register hits are indicated by the register position 78 and 79 thereby indicating that register hits occur in the instruction sequences fed to execution units 13 and 14 with no register hits occurring on instruction sequences fed to execution units 14 and 15. The left hand side of the register 69 shown in FIG. 6 shows again four one bit registers marked collectively as 76 corresponding again to respective execution units 12–15 but indicating the presence or absence of hits from instructions located in slot 1 of the instruction word shown in FIG. 3. When operating in GP16 or GP32 mode, the register location 77–80 in the right hand half of the register are initially set to identify the location of any hits and bits in the left hand half 76 representing slot 1 remain at 0 until all hit bits in the slot 0 half 75 have been cleared. When any hits in the slot 0 section of the register 69 have been cleared then any detected register hits derived from slot 1 of the instruction word can be entered in the left hand half 76. When operating in VLIW mode, the rules for the combination of instructions in VLIW mode are such that instructions located in slot 2 or slot 3 can only be used for a register hit in an instruction sequence executed by one of the execution units and in this case it is the execution unit indicated by register 80 in FIG. 6. The corresponding bit in the left hand side of register 69 can be set to indicate a hit arising from slot 3 in VLIW mode.

The manner of setting the hit register 69 will be explained with reference to FIG. 5 which illustrates the setting of hits derived from slot 0. In this case the watch register 60 is set to watch registers identified as R1 and R2 in the execution units 12–15. The information derived from decoding the instruction in slot 0 is indicated in table 85 and indicates that unit 12 will change a data value in register R5, unit 13 will change a data value in register R6, unit 14 will change a data value in register R0 and execution unit 15 will change a data value in register R1. Consequently only the value in register R1 is being watched by the indication in the watch register 60. The comparison operation indicated at 86 will cause one bit in register 69 to be set to the value 1 indicating the fourth execution unit whereas the remaining bits remain at 0.

The sequence of operations in the control unit 40 for handling a register watch on two successive instructions in GP16 or GP32 mode is shown in FIG. 7. The first instruction is derived from slot 0 where as the second instruction is derived from slot 1 of the instruction word format shown in FIG. 3. The control unit 40 includes a clock so that the decoding and dispatch operations as well as the execution in the execution units is carried out on clocked cycles. In the sequence of six cycles shown in FIG. 7, the first instruction in slot 0 has been decoded and the microinstructions generated by unit 17 and the hit register 69 set by use of the comparator 66. At cycle 0 the instruction from slot 0 is dispatched and the contents of the hit register 69 are evaluated. In this example hits are indicated in bit positions 78 and 79 corresponding to the example shown in FIG. 6. This means that in cycle 1 a store register value instruction is inserted in the instruction sequence supplied to the dispatcher 17 and the number of the architectural register being watched is supplied by the hit register to the emulator circuit 25. The store register instruction which is inserted in the sequence has the guard value "ever" indicating that the instruction must be executed. This changes the contents of the hit register 69 to remove the bit set at position 79 leaving only the bit set at 78. Consequently in cycle 2 a store register instruction is inserted in the instruction sequence supplied to the execution unit indicated by the location of bit 78 and the number of the watched register which gave rise to setting bit 78 is supplied along line 27 to the emulator circuitry 25. Again the instruction is given the guard value "ever" and bit 78 is cleared in the hit register 69. This leaves the hit register 69 empty ready for use with the instruction now taken from slot 1. In cycle 3 the instruction from slot 1 is output by the dispatcher 17 and the contents of the hit register 69 resulting from comparison of the contents of the instruction from slot 1 with those in the register watch store 60 sets the correct bit locations in the left hand half of the hit register 69. After dispatch of the instruction from slot 1 during cycle 3 cycle 4 inserts a store register instruction in the instruction sequence fed to the execution unit indicated by the set bit 90 in FIG. 7. The insertion of the store register instruction immediately follows the instruction which gave rise to the register hit and is given the guard value "ever". Bit 90 is then returned to 0 leaving only the bit set at position 91. This causes cycle 5 to insert a further store register instruction in the instruction sequence fed to the execution unit indicated by bit 91 and the register number giving rise to the register hit is supplied to the emulator circuitry 25 via line 27. The hit register 69 is then cleared. In this way no cycles are lost in evaluating which is the next register to have its date of content sent to the emulator circuitry 25 by execution of a store register instruction. The pipelined execution is however extended by the insertion of the additional store register instructions in the instruction sequences where register hits have been found. The evaluation of which register values are to be sent to the emulator circuitry 25 is carried out simultaneously with dispatch of the preceding instruction by the dispatcher 17.

FIG. 8 illustrates the procedure for executing an instruction in the VLIW mode. In this case four 32 bit instructions are supplied simultaneously to the decoder 21. After decoding the hit register 69 is set in accordance with the registers identified in the register watch store 60 and microinstructions are generated in the dispatcher 17. In cycle 0, the four instructions are output by the dispatcher 17 and the contents of the hit register 69 are evaluated. As previously explained, only two execution units can in this instruction mode have register hits and as illustrated in FIG. 8 these occur at bit positions 79 and 93. During cycle 1 a store register instruction is inserted in the instruction sequence supplied to the execution unit indicated by bit location 79. The number of the architectural register identified for the register hit is supplied by the control unit 40 along line 27 to the emulator circuit 25. The instruction inserted in the sequence has the guard value "ever". Bit 79 is then cleared so that during cycle 2, a store register instruction is inserted in the instruction sequence supplied to the execution unit identified by bit 93 and again has the guard value "ever" and the identified register is indicated to the emulator circuit 25 via line 27. The hit register 69 is then cleared. Again no cycles are lost during the evaluation of the next register which requires its data value to be sent to the emulator circuit 25. Delay only occurs by the extended instruction sequence resulting from inserting store register instructions.

It will be appreciated that in all the above examples, the appropriate execution unit 12–15 will execute the store register instruction immediately after the instruction which gave rise to the register hit and consequently the data value that has been put into the register identified by the register hit will be supplied to the store 52 accessible by the emulator circuit 25.

The invention is not limited to the details of the foregoing example.

What is claimed is:

1. A computer system for executing a sequence of instructions and effecting changes in data held in one or more registers during execution of the instructions which computer system includes instruction fetch circuitry, decode circuitry to decode instructions and identify any registers to be used in execution of the instruction, and dispatch circuitry to dispatch instructions to one or more execution units after decoding, said computer system including emulator circuitry for debug operations which emulator circuitry is arranged to watch data values in one or more selected registers modified during execution of the instructions, which computer circuitry further comprises a register watch store for identifying one or more registers to be watched, comparator circuitry for comparing registers identified by said decode circuitry with registers identified in said register watch store and providing a hit signal for hits in the comparison, and instruction insertion circuitry responsive to hit signals to insert in the instruction sequence to an execution unit a store instruction to store in a location accessible by the emulation circuitry the data value in a data register identified by a hit signal after execution of the instruction using the data register.

2. A computer system according to claim 1 in which the register watch store is responsive to the emulator circuitry to select which registers are identified in the register watch store.

3. A computer system according to claim 1 in which the emulator circuitry includes program count watch circuitry for watching fetch addresses supplied to a program memory and providing a program count indication for any selected instruction supplied to an execution unit.

4. A computer system according to any one of the preceding claims in which a plurality of parallel execution units are provided and said comparator circuitry is arranged to identify which execution unit will receive any instruction providing a hit signal.

5. A computer system according to claim 3 in which the instruction fetch circuitry is arranged to fetch more than one instruction in each fetch operation, the instructions being supplied in parallel to respective execution units and said comparator circuitry being operable to identify hit signals for more than one parallel instruction.

6. A computer system according to claim 1 in which the or each execution unit comprises a pipelined execution unit.

7. A computer system according to claim 1 in which the register watch store comprises a plurality of registers each identifying a respective data register usable in execution of an instruction, said emulator circuitry being operable to identify in said plurality of registers which data registers are to be watched.

8. A computer system according to claim 7 in which said comparator circuitry is operable to compare the output of said decode circuitry with said plurality of registers and to set values in a hit signal store where register hits are found in said comparison.

9. A comparator system according to claim 1 in which said instruction insertion circuitry is arranged to insert a store instruction in each instruction sequence immediately after any instruction which is decoded and provides said hit signal.

10. A computer system according to claim 1 in which the store instruction inserted in the instruction sequence is arranged store the data register value in a store location determined by the emulator circuitry.

11. A computer system according to claim 1 in which the computer system comprises a single integrated circuit device and said emulator circuitry is located on the same chip.

12. A method of executing a sequence of instructions in a computer system and effecting changes in data held in one or more registers during execution of the instructions, which method comprises fetching a sequence of instructions from a program memory, decoding fetched instructions and identifying any registers to be used on execution of each instruction, dispatching decoded instructions to one or more execution units after decoding and executing said instructions, said method further comprising operating emulator circuitry for a debug operation by identifying one or more registers to be watched during instruction execution, comparing said identified registers with registers indicated during decoding of instructions to be executed and forming a hit signal where execution of any instruction will use a register corresponding to an identified register to be watched, and in response to said hit signal inserting a store instruction in the instruction sequence to be supplied to the execution unit so as to store the data value put into the identified register in a store accessible to the emulator circuitry.

13. A method of executing instructions in a comparator system according to claim 12 in which instructions are fed in parallel to a plurality of parallel execution units.

14. A method according to claim 12 in which the or each execution unit executes instructions in a pipelined operation.

15. A method of executing a sequence of instructions in a computer system as claimed in claim 12 in which each instruction in the instruction sequence includes a guard or prediction value to be determined on execution of the instruction, said inserted store instructions having a guard value which confirms that the store instruction will be executed.

* * * * *